Figure 1:
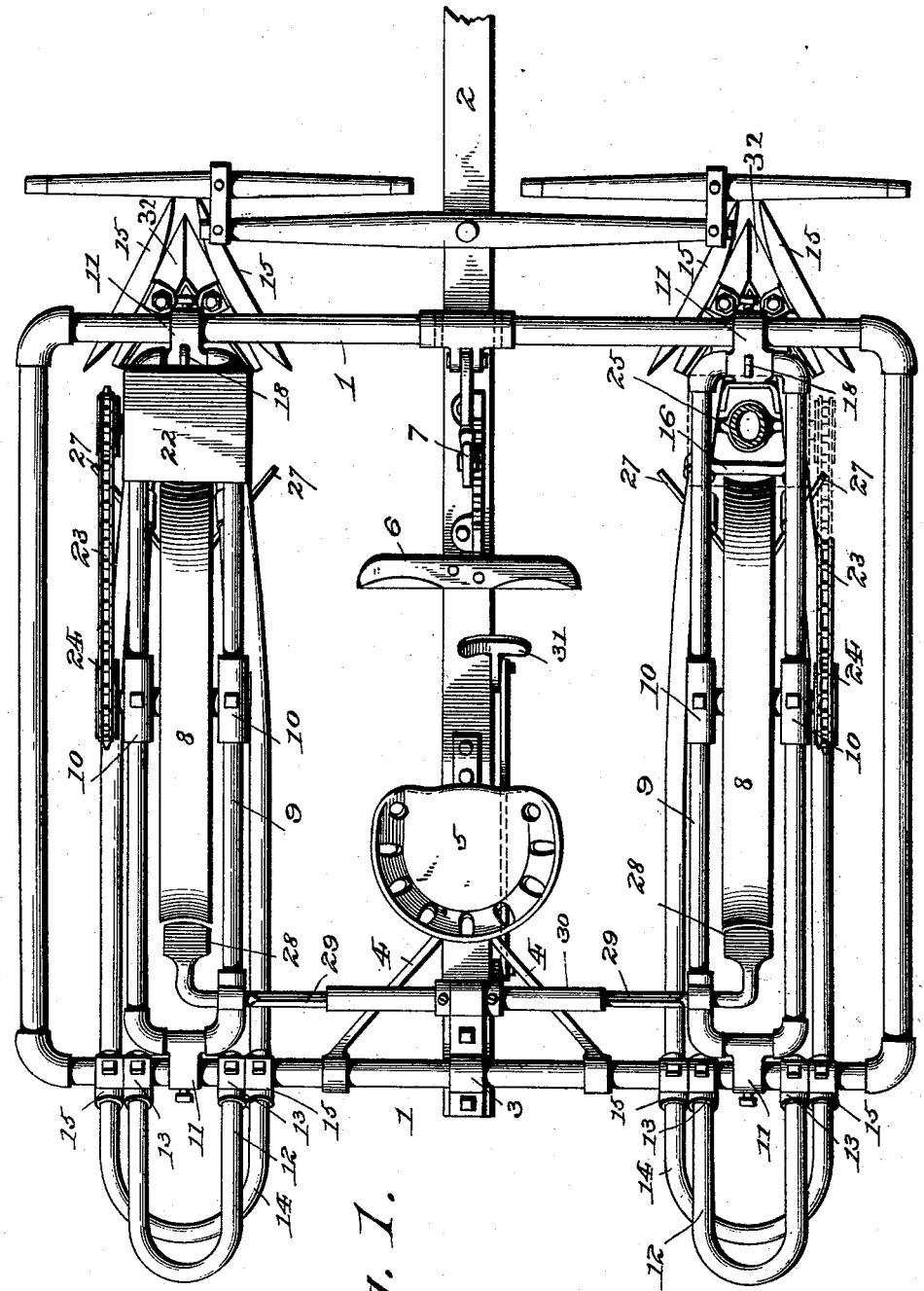

(No Model.)
2 Sheets—Sheet 1.

G. L. WHITING.
CORN PLANTER.

No. 536,246.

Patented Mar. 26, 1895.

Witnesses

Inventor
George L. Whiting
By Attorney

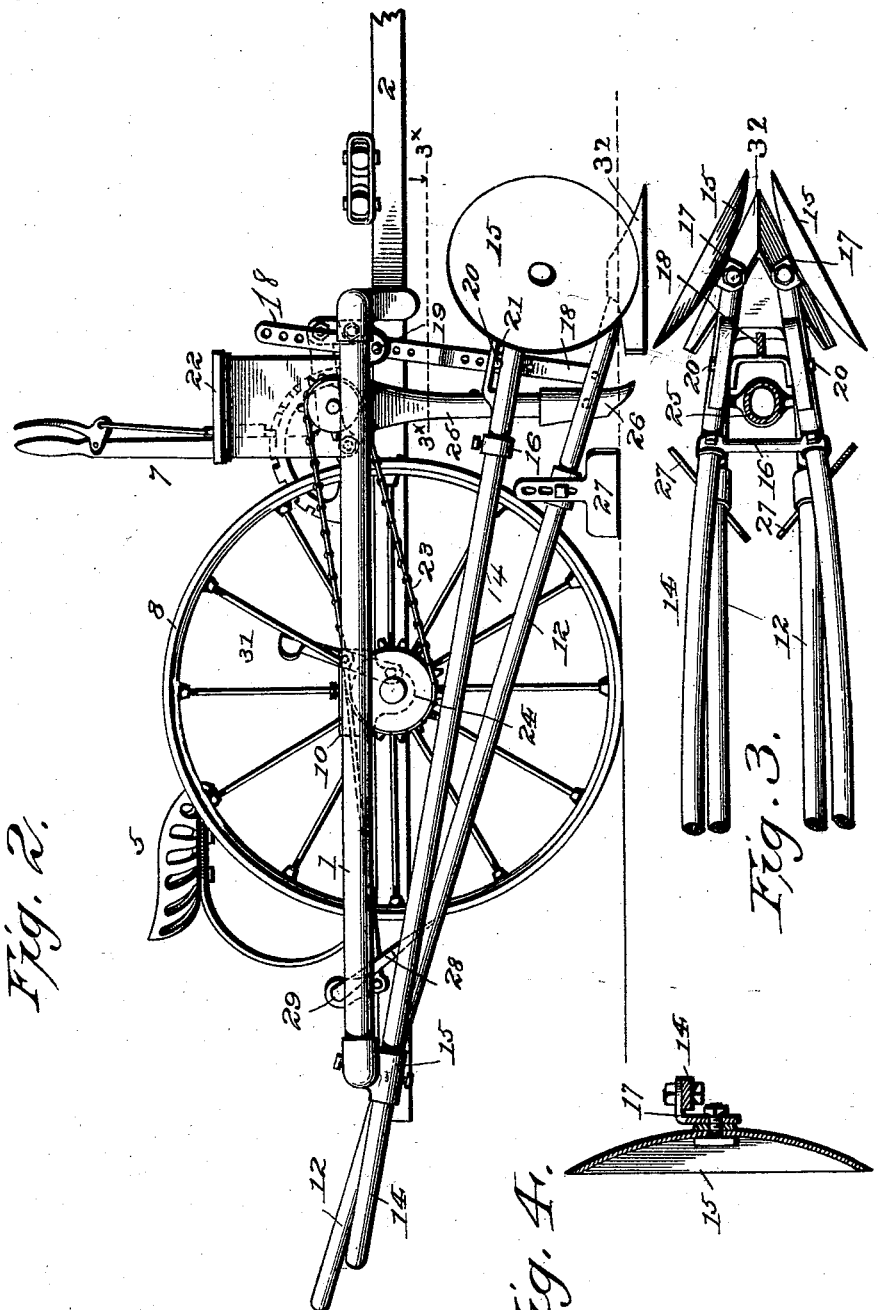

UNITED STATES PATENT OFFICE.

GEORGE LESLIE WHITING, OF WATERBURY, NEBRASKA.

CORN-PLANTER.

SPECIFICATION forming part of Letters Patent No. 536,246, dated March 26, 1895.

Application filed February 7, 1894. Serial No. 499,341. (No model.)

*To all whom it may concern:*

Be it known that I, GEORGE LESLIE WHITING, a citizen of the United States, residing at Waterbury, in the county of Dixon and State of Nebraska, have invented certain new and useful Improvements in Corn-Planters; and I do hereby declare the following to be a full, clear, and exact description of the invention, such as will enable others skilled in the art to which it appertains to make and use the same, reference being had to the accompanying drawings, and to figures of reference marked thereon, which form a part of this specification.

The object of the present invention is to provide a planter specially for use in light soil and on ground where there is more or less trash and material to collect on and clog a runner or an ordinary shovel.

The invention relates particularly to planters for listing corn, and it consists of numerous details of construction and arrangement all of which will be fully described and then pointed out in the claims.

In the accompanying drawings:—Figure 1 is a plan view of a planter embodying the features of my invention. Fig. 2 is a side elevation of the same. Fig. 3 is a detail sectional plan view taken below one of the feed boxes, on line $3^x$—$3^x$ of Fig. 2, and Fig. 4 is a sectional detail view of one of the disks and attachments.

The rectangular frame, 1, preferably made of tubing, forms the main frame of the machine, and the draft pole, 2, passes under the front bar of the frame, 1, and is hung to the middle of the rear bar of the frame at 3, and is braced to the frame by the braces, 4, 4.

The machine is a double lister corn planter, the parts on one side being a duplication of those on the other. The driver's seat is shown at 5, with foot rests, 6; and for raising the front of the frame 1, with respect to the pole, 2, and thereby raising the lister and planting devices carried by the frame 1, when desired, there is a lever, 7.

The wheels, 8, are mounted in frames, 9, and the bearings, 10, for the wheels, carried by the side bars of the frames 9, are adjustable on said side bars and can be moved thereon forward or back in order to adjust the balance of the machine. The frames 9 are hung at both their forward and rear ends on the front and back bars respectively of the frame 1 by the collars 11, 11, and the latter can be moved on the frame, 1, in toward the pole or out toward the end of the frame and thereby lessen or increase the distance between the rows to be planted. The collars 11 have set screws or other devices for locking the frames 9 to the frame 1. Hung from the back bar of the frame 1, on either side of each of the wheel frames 9, there is a bow frame 12 formed preferably of a rod or pipe section, or channeled iron, bent double and passed through collar hangings, 13, in which the frame, 12, can be adjusted in or out, to throw the subsoiler carried by said frame, and hereinafter described, either forward or back as desired; and said collar hangings swing on the rear bar of the frame 1 and are laterally movable thereon along with the wheel frames 9. Hung on said rear bar of the frame 1, and outside of the subsoiler frame 12, there is a second frame or yoke 14, made in like manner of a rod or piping, or channeled iron, and adjustably hung in collar hangers 15, there being set screws or locking devices for fastening the frames 12 and 14 in their respective collars. Each of the yoke frames 14 carries at its forward end a pair of disks, 15, set with their edges together in front and forming a lister plow. The ends of the open frame, 14, bend in toward each other in front of the wheel, 8, and they are braced by a connecting rod, 16, which can be moved on the converging ends of the frame 14, in or out, and thereby bring the disks 15 nearer together or farther apart as the case may be. The plow disks 15 are preferably attached to the end of the frame 14 by means of a right angled piece or plate, 17, one arm of which is bolted in a horizontal plane to the end of one bar of the frame, 14, and the other arm of the angle piece carries the bearing pin of the lister disk. The angle piece 17 can be set at an angle with respect to the bar of the frame, 14, before it is bolted thereon, thereby fixing the angle of the disks 15, 15, with respect to each other, and the angle plates, 17, can be turned with their vertical members either up or down, thereby raising or lowering the set of the disks with respect to their carrying frames. In the present case the disks are shown in their lowest position.

The ends of the subsoiler frame, 12, in like manner come together in front, and attached thereto there is a subsoil or double moldboard plow 32, which by means of the adjustment of its frame, 12, in its collar hangers, may be set well forward under the lister disks 15, or farther back, according to the nature of the ground worked, or as otherwise desired. Pivoted to the frame 12, a little in the rear of the subsoil plow 32, there is a rod 18 which passes up between the arms of the frame 14, and through a slot in the front end of the wheel frame 9, or other part of the frame; and this rod has a series of holes near its upper end to engage with a pin 19, passed through eyes carried by the frame 9, to fix the depth of the subsoiler. A second pin 20, passed through one of the lower series of holes in the rod 18, engages with a slot, 21, in the arms 14, of the lister plow, and by properly setting the pins 19 and 20 the distance of the subsoiler below the lister disks, the position of both with respect to the frame of the planter and the bearing wheels, can be fixed.

The seed boxes, 22, are mounted on the wheel frames, 9, in front of the wheels, and the feed wheels therefor are driven by sprocket chains, 23, running to sprocket wheels, 24, on the hub of the wheels, 8. This is in the case of listed corn.

If it is to be check-rowed the machine is provided with proper check row devices. Many such are well known and as the same does not constitute any part of the present invention and can be added by any one skilled in the art, they need not be shown or described. The seed tube, 25, from a seed box, 22, passes down to a drill shoe, 26 carried by the subsoiler frame 12, in the rear of the subsoiler.

The covering blades 27 are carried by the frame 12, and are adjustable thereon both vertically and angularly in a horizontal plane. In the process of planting, the wheels, 8, following cover the seed and the scrapers for said wheels are shown at 28. They are hung from the wheel frames 9 behind the wheels, on rock shafts 29 which extend inward and have angular ends telescoping into a tubular piece 30 mounted in bearings on the pole 2, and an arm carried by the piece 30 is connected by a rod with the foot lever 31. By bearing on the foot lever 31 the scrapers 28, are held against the wheels.

The adjustability of the planter for any width between rows will be appreciated by farmers and for certain kinds of ground the disk listers have advantages not possessed by any other style of plow. The disks scour and clean themselves and do not hold and carry along rubbish. The ground adjacent to the line of the seed is well pulverized and the wall of compressed earth that a mold-board plow leaves and which retards the growth of the seed is avoided.

The arrangement of the lister plow and the subsoiler at the forward end of the rearwardly extending arms hung from the rear of the machine gives an arrangement which easily forces the lister plow and subsoiler into the ground and holds them there.

Having thus described my invention, what I claim is—

1. The combination in a planter, of a double disk lister plow, whose individual disk plows are angularly adjustable, the beams carrying said plows adapted for vertical adjustment, and the pivoted supports or rods carrying said beams, also adapted, themselves, for vertical adjustment, substantially as set forth.

2. The combination in a planter of a frame carrying a pair of frames laterally adjustable therein, a draft pole attached to the rear side and extending underneath and beyond the front of the main frame with means for raising and lowering the front side of said main frame with respect to the pole, said pair of frames each carrying a wheel and the ground opening and planting devices, substantially as and for the purpose set forth.

3. The combination in a planter of a main frame coupled at its rear side to the pole and having means for raising and lowering the front side of said frame with respect to the pole, with a forwardly projecting frame hinged to the rear side of the main frame and embracing a wheel and adjustably supported at its forward end with a lister plow carried thereby, substantially as and for the purpose set forth.

4. The combination in a planter of a main frame coupled at its rear side to the pole and having means for raising and lowering the front side of said frame with respect to the pole, with a pair of forwardly projecting frames hinged to the rear side of the main frame and embracing a wheel and adjustably supported at their forward ends, with a lister plow carried by one of the frames of said pair, and a subsoiler, drill shoe and covering blades carried by the other, substantially as and for the purpose set forth.

5. The combination in a planter of a frame carrying a wheel mounted therein and said frame laterally adjustable on the main frame of the machine, with a lister plow frame and a subsoiler frame hung from the rear of the machine and laterally movable with the wheel frame, said lister plow and subsoiler frames embracing the wheel and adjustably supported at their forward ends, substantially as and for the purpose set forth.

6. In a planter, the combination of a double-disk lister-plow, a seed dropping mechanism, a subsoil-plow, and a frame carrying said subsoil-plow and itself carried and suitably adjusted in collar-hangers, to effect the adjustment of said subsoil-plow relative to said lister-plow, substantially as described.

7. In a planter, the combination, with a seed dropping mechanism, of the double-lister-plow disks and a frame with converging endportions carrying said disks and having a connecting bar for its members adapted to slide thereon to effect the relative adjustment of said disks, substantially as set forth.

8. In a planter, the combination, with a seed-dropping mechanism, the subsoil-plow, a yoke or frame carrying said plow, and the converging blades also carried by, and vertically and angularly adjustable on the latter frame, substantially as set forth.

In testimony whereof I affix my signature in presence of two witnesses.

GEO. LESLIE WHITING.

Witnesses:
STORY B. LADD,
OLIVER W. BAILEY.